(12) United States Patent
Wilber

(10) Patent No.: US 6,313,590 B1
(45) Date of Patent: Nov. 6, 2001

(54) COMPENSATION OF VERTICAL DEFLECTION

(75) Inventor: James Albert Wilber, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/599,627

(22) Filed: Jun. 22, 2000

(51) Int. Cl.$^7$ .............................. G09G 1/04; H01J 29/70

(52) U.S. Cl. .......................................... 315/389; 315/403

(58) Field of Search ................................ 315/387, 388, 315/389, 403

(56) References Cited

U.S. PATENT DOCUMENTS 5,369,341 * 11/1994 Wilber .................................. 315/389

* cited by examiner

*Primary Examiner*—David Vu
(74) *Attorney, Agent, or Firm*—Joseph S. Tripoli; Harvey D. Fried; Francis A. Davenport

(57) ABSTRACT

A vertical deflection amplifier drives a vertical deflection coil according to a ramp input signal and has a current sensing resistor providing a feedback signal. The vertical deflection coil is subject to crosstalk or excitation by a horizontal deflection coil. A compensation network is coupled between a source of the horizontal deflection signal and the current sense resistor, and has a network that produces a corrective current in the current sense resistor to substantially cancel horizontal rate crosstalk component from the feedback signal.

9 Claims, 1 Drawing Sheet

COMPENSATION OF VERTICAL DEFLECTION

This invention relates to vertical deflection circuits for raster displays, and in particular to the correction of unwanted interaction between horizontal and vertical deflection signals.

BACKGROUND OF THE INVENTION

In deflection systems for television, computer monitors and other cathode ray tube display devices, deflection coils are provided on horizontal and vertical axes for scanning an electron beam at different frequencies along horizontal lines that are successively spaced vertically to define a raster. The respective horizontal and vertical deflection coils or yokes are oriented at perpendicular axes orthogonal one with the other. However, it is common for some coupling to occur between the horizontal and vertical yokes. Although the horizontal scanning frequency is substantially higher than the vertical frequency, coupling between the horizontal and vertical deflection systems can cause problems which require that the unwanted coupling be taken into account in the deflection system design.

In a deflection yoke assembly having a horizontal saddle coil and vertical torroid construction, the horizontal flux path flows from the center of a top vertical winding half toward the respective ends of that winding. However, this horizontal flux flows in the opposite direction in the bottom vertical winding half. Thus if the changing horizontal flux induces a voltage in the vertical coil, for example having a polarity plus to minus from center to edges of the top vertical winding half, the voltage induced in the bottom vertical winding half is in the opposite direction. Stray capacitance of the vertical windings when combined with vertical winding inductance results in a high Q resonant circuit that can generate a significant voltage, when excited at the horizontal frequency, when resonant at the center of the vertical winding layer. Hence when the vertical winding is excited by horizontal retrace energy, ringing can result which extends well into active horizontal video time. The resulting horizontal rate perturbation of the vertical scan cause apparent raster brightness changes in the form of vertical bars. The resonance effects of the vertical windings are spoiled by a damping network which is connected between center taps of the layers in each winding half that are subject to the unwanted resonance. The damping network causes a current to flow through the damping network which loads the resonant vertical coil Q. Thus excitation by horizontal retrace energy is greatly reduced and raster brightness bars are eliminated. However, a significant unwanted horizontal frequency current is coupled through the entire vertical winding and the vertical scan current sensing resistor. This horizontal frequency excitation of the vertical coils is substantially independent of the orthogonality of the windings.

An exemplary vertical deflection coil is driven by a deflection amplifier responsive to a vertical ramp signal, and forms part of a negative feedback loop responsive to a voltage developed across a current sensing resistor connected in series with the vertical deflection coil. The horizontal frequency damping network forms a horizontal frequency current which is also coupled via the current sensing resistor. Thus, the vertical deflection amplifier receives feedback signals having components due to the vertical scanning current and the unwanted horizontal deflection current, coupled via the damping network and representing, for example a second derivative of the horizontal current. As a result of this mixture of feedback signal components, the vertical deflection amplifier is required to possess sufficient dynamic range to generate an output signal which is responsive to the feedback signal mixture without signal clipping, asymmetrical limiting, transient response distortion or slew rate limitation. The damping network and resultant horizontal rate current are needed, but can cause additional deflection amplifier power dissipation and vertical deflection signal distortion. Thus it would be advantageous to utilize the vertical damping network but eliminate the horizontal rate current component from the vertical deflection feedback signal that controls the vertical amplifier.

SUMMARY OF THE INVENTION

According to an aspect of this invention, a damping network is provided as discussed, but the damping current signal at the current sense resistor in the feedback control loop of the vertical deflection amplifier is advantageously compensated, permitting the feedback control loop to respond substantially to a vertical deflection signal and not horizontal frequency crosstalk signal components. Thus the advantageous damping of unwanted horizontal frequency excitation eliminates raster brightness variation, and inventive horizontal frequency compensation substantially eliminates horizontal frequency signal components from the vertical deflection feedback control loop. This is accomplished according to the invention by filtering a signal derived from a horizontal flyback pulse, and coupling the filtered signal to the current sense resistor in the feedback control loop of the vertical deflection amplifier.

DETAILED DESCRIPTION

Figure 1:
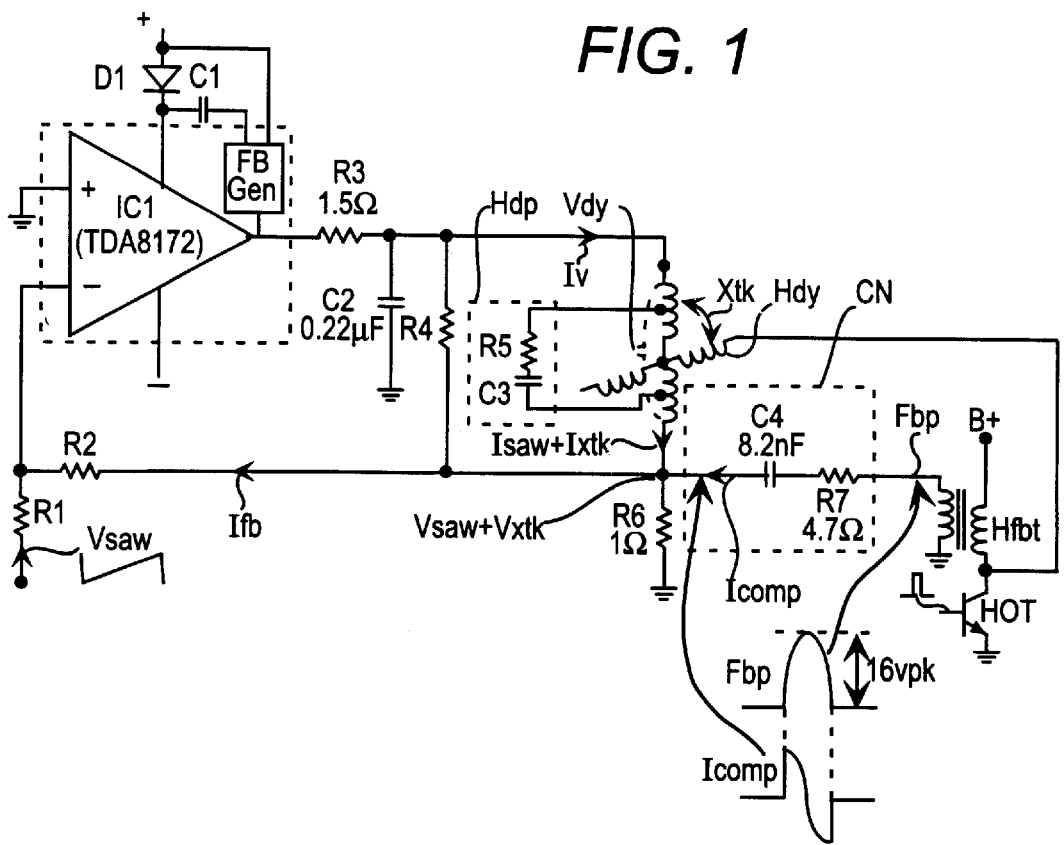
FIG. 1 is a partial schematic diagram illustrating compensation of vertical deflection according to the invention.

Referring to FIG. 1, a vertical deflection amplifier IC1 directly drives a vertical deflection yoke Vdy of a scanning beam cathode ray display tube (not shown). The deflection yoke Vdy as shown comprises two coil sections coupled in series. The two coil sections are symmetrically mounted on opposite lateral sides of the neck of the cathode ray tube and produce a magnetic field that deflects the beam vertically as a function of current flow in the yoke. The vertical deflection yoke Vdy is driven at the relatively lower vertical scanning rate, in conjunction with a horizontal deflection yoke Hdy, operated at a higher horizontal rate. The horizontal yoke Hdy also has two symmetrical coil sections. The horizontal coil sections are spaced vertically at right angles to the coil sections of vertical yoke Vdy.

The vertical and horizontal yokes are driven with deflection signals that include correction waveform signal to compensate for the cathode ray tube geometry. A vertical deflection current signal Isaw, nominally coupled to drive the vertical yoke Vdy, substantially tracks the voltage input signal Vsaw. A negative feedback signal Ifb is summed at an input of amplifier IC1 as necessary to produce a yoke current Isaw that follows the input signal Vsaw.

The horizontal deflection yoke is driven by pulses applied to the base of a horizontal output transistor HOT, coupled to a flyback transformer Hfbt, which is in turn coupled to the B+ power supply voltage. The vertical yoke Vdy is driven by amplifier IC1, which is a power amplifier responsive to vertical sawtooth signal Vsaw, generated in synchronism with a vertical synchronizing signal associated with the image signal being displayed.

The vertical deflection amplifier IC1 as shown directly drives the two serially coupled coil sections of vertical yoke Vdy. A suitable amplifier is, for example, an ST type TDA8172, which contains a flyback generator associated with snubbing diode D1 and capacitor C1 coupled to the vertical supply voltage. Amplifier IC1 is driven in a current feedback control mode and generally produces a current Iv in vertical deflection coil Vdy that follows the voltage level of input signal Vsaw, coupled to the inverting input of amplifier IC1 through a series resistor R1.

The feedback signal Ifb to amplifier IC1 represents the current in the vertical deflection yoke. The vertical yoke Vdy output of amplifier IC1 is coupled to ground through a current sensing resistor R6, for example a 1 ohm resistor. The voltage developed across resistor R6 is substantially proportional to the current in vertical yoke Vdy, and is coupled via a feedback path formed by series resistor R2 to the inverting input of amplifier IC1. The non-inverting input of amplifier IC1 is coupled to a reference potential, for example ground.

A crosstalk signal Xtk occurring at the horizontal scanning rate is coupled from the horizontal deflection yoke Hdy to the vertical deflection yoke Vdy, due to, for example, overlap or interaction of their respective magnetic fields and close capacitive coupling. Thus, the current in the vertical deflection yoke Vdy actually comprises the intended sawtooth driving current Isaw, plus an induced or excitation current Ixtk occurring at the horizontal rate. As a result, the voltage feedback signal produced by current sense resistor R6 contains these two components, shown as Vsaw+Vxtk.

The output of amplifier IC1 is coupled to vertical yoke Vdy through an output compensation network defined by series resistor R3, which has a relatively small resistance and capacitor C2 which is connected to ground. Resistor R3 and capacitor C2 form a low pass filter. Additionally, a resistor R4 is coupled is coupled substantially in parallel with the output of amplifier IC1, and provides a yoke damping resistance. These components operate with amplifier IC1 to produce the sawtooth driving current.

A horizontal frequency damping network comprising resistor R5, for example having a value of 1500 ohms, and capacitor C3 for example, having a value of 220 pico Farads is coupled in parallel with a portion of vertical deflection yoke Vdy, to damp induced horizontal frequency signals in the vertical deflection coil Vdy occurring due to unavoidable coupling between the horizontal and vertical yokes. Specifically, resistor R5 and capacitor C3 are coupled in series with one another and in parallel with a portion of the vertical deflection yoke Vdy, preferably between the center taps of the two coil sections that are mounted on opposite sides of the cathode ray tube.

The horizontal damping network of resistor R5 and capacitor C3 has the desired effect of tending to damp the induced horizontal rate signals in the vertical yoke Vdy. Part of the energy induced in the vertical yoke is diverted and dissipated in the damping network, causing horizontal rate artifacts to be attenuated to a sufficient level that the vertical scanning velocity is not noticeable perturbed in the active video region. However, the horizontal damping network current also resides in the load coupled to amplifier IC1 and this solution does not eliminate a horizontal rate current in current sensing resistor R6 due to excitation by horizontal deflection yoke Hdy. As a result, the current Isaw+Ixtk in resistor R6 produces a voltage feedback signal Vsaw+Vxtk that contains a component of the horizontal rate crosstalk component. The primary object of amplifier IC1 is to produce a current signal Isaw that tracks input signal Vsaw, representing the desired vertical scanning ramp. The additional influence of the horizontal rate feedback signal Vxtk adds to the output drive requirement of amplifier IC1, and may cause over-driving of amplifier IC1, or at least necessitate a power supply range ("headroom") to prevent signal clipping or assymetrical limiting and dynamic capacity beyond that required to produce the vertical rate output ramp needed in vertical deflection yoke Vdy for scanning the electron beam.

According to an aspect of the invention, the overhead associated with driving vertical deflection amplifier IC1 to accommodate the horizontal crosstalk component coupled to the feedback signal Vsaw+Vxtk is advantageously obviated by adding a corrective signal component at the feedback resistor R6 to reduce or substantially eliminate the crosstalk component Vxtk from the feedback signal without otherwise altering operation the damping network formed by resistor R5 and capacitor C3 or vertical deflection amplifier IC1 producing the vertical current ramp drive signal in vertical deflection coil Vdy. A corrective current component is formed by compensation network CN and is coupled to current sense resistor R6 at the junction of resistor R6 and the vertical deflection yoke Vdy.

The current signal Ixtk in the vertical deflection yoke is a time differential of the horizontal deflection retrace signal. The compensation network CN of the invention produces a corrective current that is the inverse of crosstalk current signal Ixtk. Compensation network CN is coupled to a secondary winding of the flyback transformer Hfbt, thereby producing a flyback pulse voltage signal Fbp. Resistor R7 and capacitor C4 of compensation network CN differentiate the flyback pulse and provide a current signal Icomp, which is coupled to vertical current sense resistor R6 to cancel the crosstalk current component Ixtk from the vertical deflection yoke Vdy.

The resistance value of current sense resistor R6 is very low, for example one ohm, and as a result the compensating current Icomp has little or no effect on either the vertical deflection circuit or the vertical deflection current signal except to substantially eliminate the horizontal frequency crosstalk component from the feedback signal coupled to vertical drive amplifier IC1. This advantageous compensation signal obviates unnecessary dynamic signal processing constraints that would otherwise be required by amplifier IC1 while preserving the operational capabilities of the vertical drive amplifier to produce the vertical current ramp Isaw, and the horizontal damping properties of network Hdp to substantially eliminate horizontal rate perturbation of the vertical scan.

The time constant of compensation network CN is determined by the time constant of resistor R7 and capacitor C4. The time constant and the amplitude of the corrective signal Icomp can be adjusted by adjusting the values of resistor R7 and capacitor C4, e.g., by changing the value of resistor R7. The amplitude and waveform shape of the compensation signal should be substantially equal and opposite to the unwanted crosstalk signal Ixtk, to produce complete cancellation of the horizontal component from the feedback signal. However, because horizontal rate component is applied as a negative feedback signal, total compensation or elimination of the horizontal rate signal is not required in order to significantly reduce the dynamic signal handling requirements of the vertical deflection amplifier.

Accordingly, the invention circuit has a vertical deflection amplifier generating a current drive signal in a vertical deflection coil coupled to the deflection amplifier, with a current sensor providing a feedback signal to the vertical deflection amplifier as a function of current in the vertical deflection coil, wherein the vertical deflection coil is subject to crosstalk or excitation by a horizontal scanning component. According to an inventive aspect, a network is coupled to receive a signal from a horizontal deflection transformer, and to form a compensation component which is coupled to the current sensor for combination with the feedback signal related to the current in the vertical deflection coil. Thus, the horizontal crosstalk component of the feedback control signal fed the vertical deflection amplifier is substantially eliminated, although yoke crosstalk continues to occur but the effect is rendered substantially invisible by damping network Hdp.

The inventive compensation signal Icomp coupled to the current sensor, and therefore to the feedback input of the vertical deflection amplifier, is provided by generating the required time differential of the horizontal frequency signal, and can be derived from a secondary winding of the horizontal flyback transformer. Preferably, the compensation component is substantially equal in amplitude and opposite in polarity to the horizontal frequency crosstalk signal occurring in the current sense resistor coupled in series with the deflection yoke.

What is claimed is:

1. A vertical deflection arrangement subject to horizontal deflection distortion, comprising:
   a vertical deflection amplifier generating a drive signal;
   a deflection coil coupled to an output of said vertical deflection amplifier and forming a deflection current in accordance with said drive signal:
      a current sensor sensing said deflection current to form a feedback signal coupled to an input of said vertical deflection amplifier; and,
      a network responsive to a signal from a horizontal deflection transformer for forming a compensation signal coupled to said current sensor for combination with said deflection current.

2. The vertical deflection arrangement of claim 1, wherein said feedback signal is coupled to said input of said vertical deflection amplifier to provide negative feedback control of said drive signal.

3. The vertical deflection arrangement of claim 1, wherein said compensation signal coupled to said current sensor substantially cancels horizontal frequency crosstalk components occurring in said deflection current.

4. The vertical deflection arrangement of claim 3, wherein said compensation signal is a derivative of said signal from the horizontal deflection transformer.

5. A vertical deflection arrangement comprising:
   a vertical deflection amplifier generating at an output a drive signal responsive to a substantially ramp shaped input signal;
   a negative feedback signal coupled to an input of said vertical deflection amplifier, comprising a first signal representative of said drive signal and a second signal representative of an unwanted horizontal rate crosstalk component; and,
   a network coupled to a source generating said horizontal rate crosstalk component and coupled to said input of said vertical deflection amplifier for generating a compensation signal having a waveform shape substantially similar and of opposite signal amplitude to said second signal such that said second signal is substantially absent from said drive signal at said vertical deflection amplifier output.

6. A deflection circuit comprising:
   a vertical deflection amplifier having an output coupled to a vertical deflection circuit and a current sensor responsive to current in said vertical deflection circuit, said vertical deflection amplifier having an input responsive to a vertical drive signal and being coupled to said current sensor for feedback control responsive to current in said vertical deflection circuit;
   a horizontal deflection circuit responsive to a horizontal drive signal, and having a deflection coil generating a horizontal rate crosstalk component in said vertical deflection circuit; and,
   a compensation circuit, coupled to said horizontal deflection circuit, forming a compensation signal coupled to said current sensor of said vertical deflection circuit, said compensation signal at least partly canceling said horizontal rate crosstalk component in said vertical deflection circuit.

7. The deflection circuit of claim 6, wherein said crosstalk is coupled between horizontal and vertical deflection yokes of said vertical and horizontal deflection circuits, respectively, and said current sensor comprises a resistor in series with said vertical deflection yoke.

8. The deflection circuit of claim 7, wherein said horizontal deflection circuit comprises a flyback transformer responsive to a retrace pulse and said compensation circuit comprises a differentiator coupled to said retrace pulse.

9. The deflection circuit of claim 8, wherein said differentiator is coupled between a secondary winding of said flyback transformer and said current sense resistor.

* * * * *